(12) United States Patent
Toyoda et al.

(10) Patent No.: US 8,090,269 B2
(45) Date of Patent: Jan. 3, 2012

(54) DATA TRANSMISSION SYSTEM AND TRANSMISSION CODE GENERATING METHOD FOR THE SAME

(75) Inventors: Hidehiro Toyoda, Tachikawa (JP); Kenro Sekine, Fuchu (JP); Shinya Sasaki, Koganei (JP); Shinji Nishimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 915 days.

(21) Appl. No.: 12/007,846

(22) Filed: Jan. 16, 2008

(65) Prior Publication Data

US 2008/0240729 A1    Oct. 2, 2008

(30) Foreign Application Priority Data

Mar. 30, 2007  (JP) .................................. 2007-90205

(51) Int. Cl.
*H04B 10/04* (2006.01)
(52) U.S. Cl. ........................................ 398/188; 398/193
(58) Field of Classification Search .................. 398/188, 398/193
See application file for complete search history.

(56) References Cited

U.S. PATENT DOCUMENTS

| 4,486,739 A | 12/1984 | Franaszek et al. |
| 2003/0002121 A1* | 1/2003 | Miyamoto et al. ............. 359/183 |
| 2009/0136241 A1* | 5/2009 | Mo et al. ........................ 398/188 |
| 2010/0232803 A1* | 9/2010 | Ji et al. ........................... 398/149 |

OTHER PUBLICATIONS

Masahiro Daikoku et al, "100Gbit/s DQPSK Transmission Experiment Without OTDM for 100 G Ethernet Transport", OFC/NFOEC 2006, 3 pages.
"Physical Coding Sublayer (PCS) for 64B/66B Type 10GBASE-R", IEEE Standard 802-3-2005, pp. 223-252.

* cited by examiner

Primary Examiner — Nathan Curs
(74) Attorney, Agent, or Firm — Stites & Harbison PLLC; Juan Carlos A. Marquez, Esq.

(57) ABSTRACT

A data transmission system comprising a transmitter and a receiver. The transmitter comprises a phase encoder for partitioning consecutive bit data to be input in data in units of X bits; and converting a $2^x$ value indicated by the data of X bits in unique association with an $(N/2-1)^Y$ value of a Y symbol, and for confining use of signal points, from among the signal points of N-ary phase, only to a signal point P1 (at a phase angle 0) and N/2−2 signal points P(2n+2) (where $1 \leq n < N/2-2$). The receiver comprises a phase decoder for notifying an error detection when a signal point other than a signal point that are permitted to be used is received, and performing an error correction by changing the signal point to a signal point which has a smaller hamming distance.

5 Claims, 4 Drawing Sheets

| # | BINARY REPRESENTATION | 8-ARY PHASE REPRESENTATION |
|---|---|---|
| 0 | 000 | P1, P1 |
| 1 | 001 | P1, P4 |
| 2 | 010 | P1, P7 |
| 3 | 011 | P4, P1 |
| 4 | 100 | P4, P4 |
| 5 | 101 | P4, P7 |
| 6 | 110 | P7, P1 |
| 7 | 111 | P7, P4 |

*FIG. 4*

DATA TRANSMISSION SYSTEM AND TRANSMISSION CODE GENERATING METHOD FOR THE SAME

CLAIM OF PRIORITY

The present application claims priority from Japanese patent application JP 2007-090205 filed on Mar. 30, 2007, the content of which is hereby incorporated by reference into this application.

BACKGROUND OF THE INVENTION

This invention relates to a transmitter and a receiver for performing data transmission via a data communication path, and more particularly to an encoder/decoder capable of suppressing an occurrence of an error in a receiver in optical phase shift keying modulated transmission.

In the field of optical transmission, binary phase shift keying (BPSK) is predominantly used, in which 1 bit of information is transmitted per symbol. According to BPSK, to meet the need for increasing transmission capacity, there has been no other way than to decrease a time per symbol, which makes it difficult to increase the transmission speed. In view of this, in order to increase the transmission capacity, there has been developed various transmission methods to increase an amount of information per 1 symbol. Examples of the methods include quadrature phase shift keying (QPSK) and n-ary amplitude shift keying (nASK).

The quadrature phase shift keying (QPSK) modulated transmission is an example of optical many valued phase shift keying modulated transmission. Also, QPSK modulated transmission is a transmission method in which, signal points (P1, P2, P3, and P4) are arranged at phase intervals of $\pi/2$ radian in one cycle ($2\pi$ radian) of the same amplitude and carrier on a complex plane I-Q indicating signals corresponding to 1 symbol (see, OFC/NFOEC 2006, PDP36, 100 Gbit/s DQPSK Transmission Experiment without OTDM for 100G Ethernet Transport, hereinafter referred to as Non-Patent Document 1). The implementation of higher-order PSK has also been devised, as 8-ary phase shift keying (8PSK) modulation and 16-ary phase shift keying (16PSK) modulation.

In the optical transmission including the above-mentioned optical many valued transmission, data to be transmitted is generally subjected to transmission coding. Through the transmission coding, the appearance frequencies of 0 and 1 are made equal, to thereby achieve DC balance and limit the number of successive bits to a finite number (limited run length constraint), which leads to an advantage of, for example, suppressing deterioration in signal quality on the transmission path. For example, as a data transmission technology using a communication interface or a high-speed serial interface in a network device or in a personal computer, U.S. Pat. No. 4,486,739 (hereinafter, referred to as Patent Document 1) discloses a technology using an 8B/10B transmission code. According to the technology, when input serial data is indefinite in appearance frequency of 0 and 1 in number of successive bits, the data is partitioned into units of 8 bits so as to make the appearance frequencies of 0 and 1 equal to each other at relatively short bit intervals (several tens of bits) while limiting the number of successive bits to 5 at maximum.

Alternatively, IEEE Std 802.3-2005, Clause 49 (hereinafter, referred to as Non-patent Document 2) discloses, as another transmission code different from the above, the application of a 64B/66B transmission code. According to the technology, input serial data is partitioned into units of 64 bits, and each 64 bits of data is provided with 2 bits of header information while the 64 bits of data other than the header information is scrambled, to thereby make the appearance frequencies of 0 and 1 stochastically equal to each other, which makes it possible to achieve DC balance on a transmission path. Further, the 2 bits of header information only include "01" and "10" so as to limit the successive equivalent bits to a finite number.

SUMMARY OF THE INVENTION

However, in optical phase shift keying modulated transmission, the inventors of this invention have found the following problem in the data transmission technologies using the above-mentioned transmission codes.

In optical many valued transmission, a transmitter converts binary bit data into phase information, and further transmits the data by converting an electric signal to an optical signal. Then, a receiver performs delayed modulation by a symbol delayed Mach-Zehnder interferometer with respect to the received optical signal, and converts the optical signal into binary bit data. At this time, phase noise is caused in a source of laser to be input to a modulation circuit of the transmitter. The phase noise is generated due to amplified spontaneous emission light from a laser oscillator, which is a short-cycle noise having a frequency characteristic of the order of picoseconds.

In the optical phase shift keying modulated transmission, the receiver performs demodulation through delayed modulation by a symbol delayed Mach-Zehnder interferometer. In the demodulation, the phase difference between signal points is converted into an output voltage amplitude of a photodiode, and therefore the phase noise of the light source becomes an amplitude noise in the output voltage. Accordingly, along with an increase in number of signal points in a phase direction, it becomes more difficult to discriminate the signal points from one another, which hinders increase in number of signal points.

It should be noted that the above-mentioned problem is unique to the optical phase shift keying modulation. This problem does not occur in a wireless or wired electric transmission, because a phase noise generated in a carrier is small enough to be ignored and the receiver performs synchronous detection because it facilitates phase synchronization. In the wireless transmission, however, there occurs a problem that all the signal points have the same phase fluctuation due to an influence from a propagation path. The phase fluctuation in the wireless transmission is a phase noise having a frequency characteristic of short cycle, which is caused when the location of the transmitter or the receiver has changed. However, in the optical transmission, an optical fibre, which is used as the propagation path, is stable in characteristic, and therefore the above-mentioned problem does not occur.

According to the above-mentioned technologies disclosed in Patent Document 1 and Non-patent Document 2, in which an 8B/10B code and a 64B/66B code are used, respectively, no consideration is given to the phase noise to be caused in the optical phase shift keying modulated transmission, and therefore the error rate due to the phase noise significantly increases when the number of phases is increased. It is an object of this invention to provide a technology capable of reducing the influence of the phase noise caused in the light source when the number of phases (number of signals) is increased in the optical phase shift keying modulated transmission while allowing the receiver to detect and correct an error.

The above-mentioned object and another object of this invention and a novel feature thereof will be disclosed in the description given below with reference to the accompanying drawings.

An outline of a representative example of this invention will be briefly described as follows.

According to this invention, in the optical many valued phase shift keying modulated transmission, N signal points (P1, P2, . . . , PN) are arranged at equal phase intervals on a complex plane I-Q which indicates signals corresponding to 1 symbol. The signal points are arranged in one cycle ($2\pi$ radian) of the same amplitude and carrier. This optical many valued phase shift keying modulation is referred to as N-ary phase shift keying modulation. To simplify the following description, the intervals between the signal points are equal to one another in a phase direction, however, the intervals between the signal points according to this invention is not limited thereto.

This invention provides a data transmission system including a transmitter and a receiver which are coupled to each other through a transmission path. The data transmission system transmits data of transmitting by converting the data into an optical signal. The transmitter includes a phase encoder for converting input binary data into signal points for optical phase shift keying modulation (in other words, transmission phase information), a differential pre-coder for performing differential coding of the transmission phase, a laser generation for generating a laser of predetermined single wavelength to output a carrier, and a phase shift keying modulator for outputting an optical signal obtained through phase modulation based on the carrier and the transmission phase of an electric signal. The receiver includes a delayed modulator for detecting a phase difference between symbols from the received optical signal and converting the phase difference into the phase information of the electric signal, and a phase decoder for converting the received phase information into binary data.

The transmitter according to this invention defines, based on a symbol which has been currently transmitted, a signal point to be transmitted at the next symbol in the time axis direction, and transmits the signal point thus defined. In other words, in a case where a signal point P1 has been transmitted at a certain point in time, the transmission of any one of signal points P1 to PN is prohibited at the next point in time. More specifically, in a case where, at a certain signal point, a variance value (for example, $7\sigma$) of a phase noise included in a carrier generated by a light source which corresponds to a desired symbol error rate (for example, equal to or less than $10^{-12}$) is larger than $\frac{1}{2}$ of a signal point interval of the phase, it is defined that signal points provided at intervals larger than a variance value of an error probability distribution are only used. In the manner as described above, this invention is capable of reducing a region where the error probability distribution is overlapped between two signal points, with the result that the symbol error rate in the demodulator (that is, demodulator) and in the phase decoder of the receiver is reduced. Hereinafter, the above-mentioned process is referred to as the limitation of signal point transition.

Specific description will be given of the limitation of the signal point transition, by taking an 8-ary phase shift keying (8PSK) modulated transmission (N=8) as an example. The 8-ary phase shift keying (8PSK) modulation includes eight signal points P1 to P8. The signal points P1 to P8 are arranged on a complex plane in order of P1, P2, P3, P4, P5, P6, P7, and P8, so as to be adjacent to one another in a phase direction. At this time, the signal points P1 and P8 are arranged adjacent to each other as one cycle is completed. For example, in a case where the variance of the error probability distribution in the phase direction which corresponds to the desired symbol error rate is larger than $\frac{1}{2}$ of a minimum signal point interval ($\pi/4$ radian in this example) (in other words, $\pi/8$ radian), and is smaller than one signal point interval (in other words, $\pi/4$ radian), the signal point intervals may be set twice as large as the minimum interval. However, when all the signal point intervals are set twice as large as the minimum interval, some of the signal points are not used at all. In view of this, the signal point intervals are set such that at least one of the intervals is set three times larger than the minimum interval. Also, it is set such that the total sum of all the signal point intervals between the used signal points corresponds to one cycle ($2\pi$ radian). According to the above-mentioned method of limiting signal points, when the signal point P1 has currently been transmitted, an interval of signal points to be transmitted next is obtained by a combination of $\{3\times\pi/4, 2\times\pi/4, 3\times\pi4\}$, and three signal points P1, P4, and P6 can be used (hereinafter, for the sake of convenience, $\{3\times\pi/4, 2\times\pi/4, 3\times\pi4\}$ is referred to as $\{3, 2, 3\}$). However, the combination of the above-mentioned intervals of signal points is not limited thereto, and may include $\{2, 3, 3\}$ and $\{3, 3, 2\}$.

Further, similarly to the above, when this invention is applied to 16-ary phase shift keying modulation, a combination of intervals between signal points that can allow a maximum number of signal points to be used is $\{3, 2, 2, 2, 2, 2, 3\}$, and when the current symbol is a signal point P1, the signal points that can be used next are P1, P4, P6, P8, P10, P12, and P14. Similar to the case of 8-ary phase shift keying modulation, the combination of intervals of signal points is not limited thereto.

In other words, according to the above-mentioned method of limiting signal points, the maximum number M of signal points that can be used in N-ary phase shift keying modulation signal (N is a natural number) is determined as follows.

$$M = \left\lceil \frac{N}{2} \right\rceil - 1 \qquad (1)$$

In the phase encoder of the transmitter according to this invention, binary bit data to be transmitted is converted into phase information for phase shift keying modulation. As a specific example thereof, 3 bits of binary data can be converted into 2 symbols of 8-ary phase information, which are associated with each other, for example, as shown in FIG. 4. Similarly, the phase decoder of the receiver inversely converts the received phase information to the corresponding binary bit data.

The transmitter according to this invention uses only three signal points of the eight signal points in 8-ary phase shift keying modulated transmission. The signal points that can be used are arranged at intervals which are at least two times or three times the minimum signal point interval. Specifically, when the delayed modulator has converted an optical signal into an electric signal of phase information, in a case where the phase of the electric signal is incorrect, it is possible to detect the error when the electric signal corresponds to a signal point arranged at intervals of two times the minimum signal point interval, and it is further possible to correct the error when the electric signal corresponds to a signal point arranged at intervals of three times the minimum signal point interval. As a specific example thereof, in a case where the phase information transmitted by the transmitter at the signal point P4 is detected as the signal point P5 by the delayed modulator of the receiver, the detection can be determined as being an error because the signal at the signal point P5 is not supposed to be used. Similarly, in a case where the phase information transmitted by the transmitter at the signal point P4 is detected as the signal point P3 by the delayed modulator of the receiver, the phase information thus detected can be determined as being incorrect, and it is possible to perform an error correction by changing the signal point P3 to the signal point P4 because the hamming distance from the signal point P4 is 1 and the hamming distance from the signal point P1 is 2.

Effects of this invention which can be obtained from representative embodiments of the invention will be briefly described below.

(1) It is possible to reduce a bit error rate in the demodulator of the receiver.

(2) It is also possible to correct an error in phase information when the phase information is converted into bit data by the receiver.

BRIEF DESCRIPTION OF THE DRAWINGS

The present invention can be appreciated by the description which follows in conjunction with the following figures, wherein:

FIG. 4 is an explanatory diagram showing binary data of 3 bits and 8-ary phase information of 2 symbols.

DETAILED DESCRIPTION OF THE PREFERRED EMBODIMENTS

Hereinbelow, embodiments of this invention will be described with reference to the accompanying drawings. In all the drawings for describing the embodiments, like numerals are used to designate like members, and a repeated description thereof will be omitted.

Figure 1:
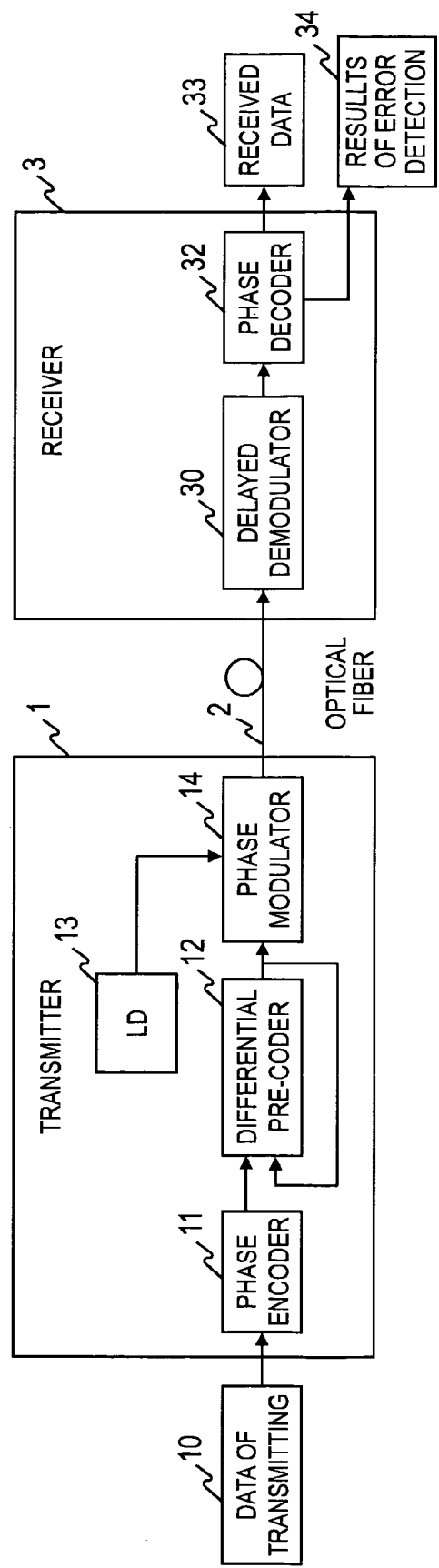
FIG. 1 is a block diagram illustrating a configuration of a data transmission system which is common to a first embodiment and a second embodiment of this invention.

The data transmission system according to a first embodiment includes, for example, as shown in FIG. 1, a transmitter 1, a transmission path 2, and a receiver 3. The transmitter 1 is coupled to the receiver 3 via the transmission path 2.

Data of transmitting 10, which is to be transmitted, input to the transmitter 1 is subjected to desired data conversion, and output to the transmission path 2. The receiver 3 subjects the received data to desired data conversion, and outputs the data as received data 33. The data of transmitting 10 and the received data 33 have the same value, as long as a transmission error in the transmission path 2 is occurring within the error correction capability of the data transmission system.

The transmitter 1 includes a phase encoder 11, a differential pre-coder 12, a laser oscillator 13, and a phase shift keying modulator 14. In the transmitter 1, the data of transmitting 10 is input to the phase encoder 11, and an output from the phase encoder 11 is coupled to the differential pre-coder 12. An output from the differential pre-coder 12 and an output from the laser oscillator 13 are coupled to the phase shift keying modulator 14, while an output from the phase shift keying modulator 14 is coupled to the transmission path 2.

The receiver 3 includes a delayed modulator 30 and a phase decoder 32. In the receiver 3, the transmission path 2 is coupled to the delayed modulator 30, and an output from the delayed modulator 30 is coupled to the phase decoder 32. Then, the phase decoder 32 outputs the received data 33.

The data of transmitting 10 includes time-consecutive binary bit data.

Figure 2:
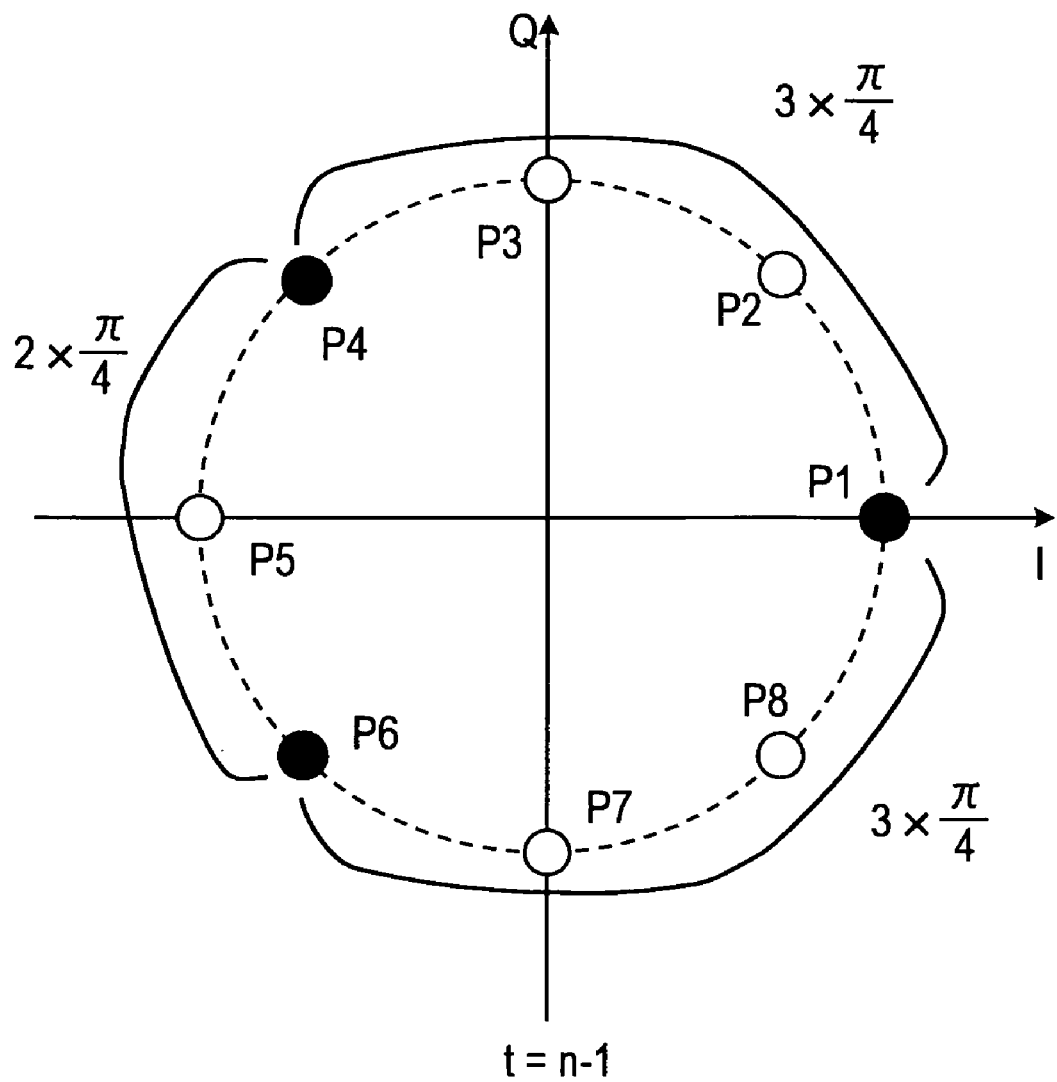
FIG. 2 is a diagram illustrating a signal point arrangement of transitional signal points in an 8-ary phase shift keying modulated transmission used in the data transmission system of the first embodiment.

The data of transmitting 10 is first input to the phase encoder 11. The phase encoder 11 partitions the data of transmitting 10, which includes a time-consecutive bit string, into blocks each formed of an equal number of bits, and converts each of the blocks into corresponding phase information. At this time, the phase information is expressed by selectively using only limited signal points, rather than using all the signal points that can be output by the phase shift keying modulator 14. As an example of the above-mentioned conversion method, a description will be given of a conversion method in which the data of transmitting 10 is partitioned into blocks in units of 3 bits, and further converted into phase information of 2 symbols which is uniquely determined based on the value of each block. In a case where the phase shift keying modulator 14 performs 8-ary phase shift keying modulation, 1 symbol includes eight signal points (from P1 to P8) as shown in FIG. 2, which are sequentially arranged in a phase direction, and only three signal points (P1, P4, an P6) of the eight signal points are used. 3 bits in the data of transmitting 10 correspond to information of $2^3=8$ values, and the phase information of 2 symbols (only three signal points are used in 1 symbol) corresponds to information of $3^2=9$ values, which are associated with each other on one-to-one basis, to thereby convert a binary bit string into phase information. At this time, the table 1 or the like is used for associating the bit string and the phase information with each other. The phase encoder 11 outputs the phase information after conversion, for each of successive symbols.

The phase information output by the phase encoder 11 is input to the differential pre-coder 12. The differential pre-coder 12 calculates the difference between the phase information output at 1 symbol before and the input phase information to perform differential coding, and outputs the difference as phase difference information. It is determined as to whether it is necessary or not to provide the differential pre-coder 12 depending on the detection method in the receiver 3. In a case where the detection method is a delayed modulation by a symbol delayed Mach-Zehnder interferometer, it is necessary to perform differential coding on a symbol-by-symbol basis in the transmitter 1. There are various methods to perform the differential coding, and according to this invention, the differential coding is performed, by way of example, based on the following expression. With the phase information φ (n) input at the time n and an output phase θ (n−1) of 1 symbol before, the output phase θ (n) is expressed as follows.

$$\theta(n) = \mathrm{mod}\ 2\pi(\theta(n-1) + \phi(n)) \quad (2)$$

In the expression, mod2π is a function for obtaining modulo-2π (a residue at 2π).

The phase difference information output by the differential pre-coder 12 is input to the phase shift keying modulator 14. At the same time, laser light with wavelength of λ output by the laser oscillator 13 is input as a carrier to the phase shift keying modulator 14. The phase shift keying modulator 14 creates, based on the input carrier, a carrier having 8 phases, and outputs only the carrier having a phase uniquely determined by the input phase difference information. In the manner as described above, an electric signal is modulated into an optical signal. According to this invention, the modulation method in the phase shift keying modulator 14 is not particularly limited.

The optical signal output by the phase shift keying modulator 14 corresponds to an output from the transmitter 1, which propagates the transmission path 2, which is an optical fibre, and is input to the receiver 2.

In the receiver 2, the received optical signal is input to the delayed modulator 30. The delayed modulator 30 performs delayed modulation by a so-called 1 symbol delayed Mach-Zehnder interferometer. The delayed modulator 30 creates a multiplexed signal obtained by multiplexing the input signal with four signals of 1 symbol time+$\pi/8$, 1 symbol time-$\pi/8$, 1 symbol time+$3\pi/8$, and 1 symbol time-$3\pi/8$. The delayed modulator 30 subjects the multiplexed signal to optical-to-electric signal conversion by using a photodiode, to thereby reproduce the transmitted phase information and outputs the phase information to the phase decoder 32. At this time, when no error is occurring in the transmission path 2 and the optical-to-electric signal conversion, there appear only the signal points (P1, P4, and P6) which are identical with the signal points used at the time of transmission. However, when an error has occurred, there appears any one of the signal points (P2, P3, P5, P7, and P8) which are not supposed to be used.

The phase decoder 32 converts the input phase information into binary data of 3 bits, based on the table 1, and outputs the data as the received data 33. In a case where the phase decoder 32 has received any one of the signal points (P2, P3, P5, P7, and P8) which are not supposed to be used, when the received signal point includes any one of the signal points (P2, P8), the signal point P3, and the signal point P7, with which an error correction is possible, the signals are each corrected to the signal point P1, the signal point P4, and the signal point P6, respectively. When the received signal point includes the signal point P5, the phase decoder 32 merely performs the error detection and notifies the results of the error detection 34.

According to a second embodiment of this invention, similar to the first embodiment, the data transmission system includes, as shown in FIG. 1, the transmitter 1, the transmission path 2, and the receiver 3. The transmitter 1 is coupled to the receiver 3 via the transmission path 2.

Figure 3:
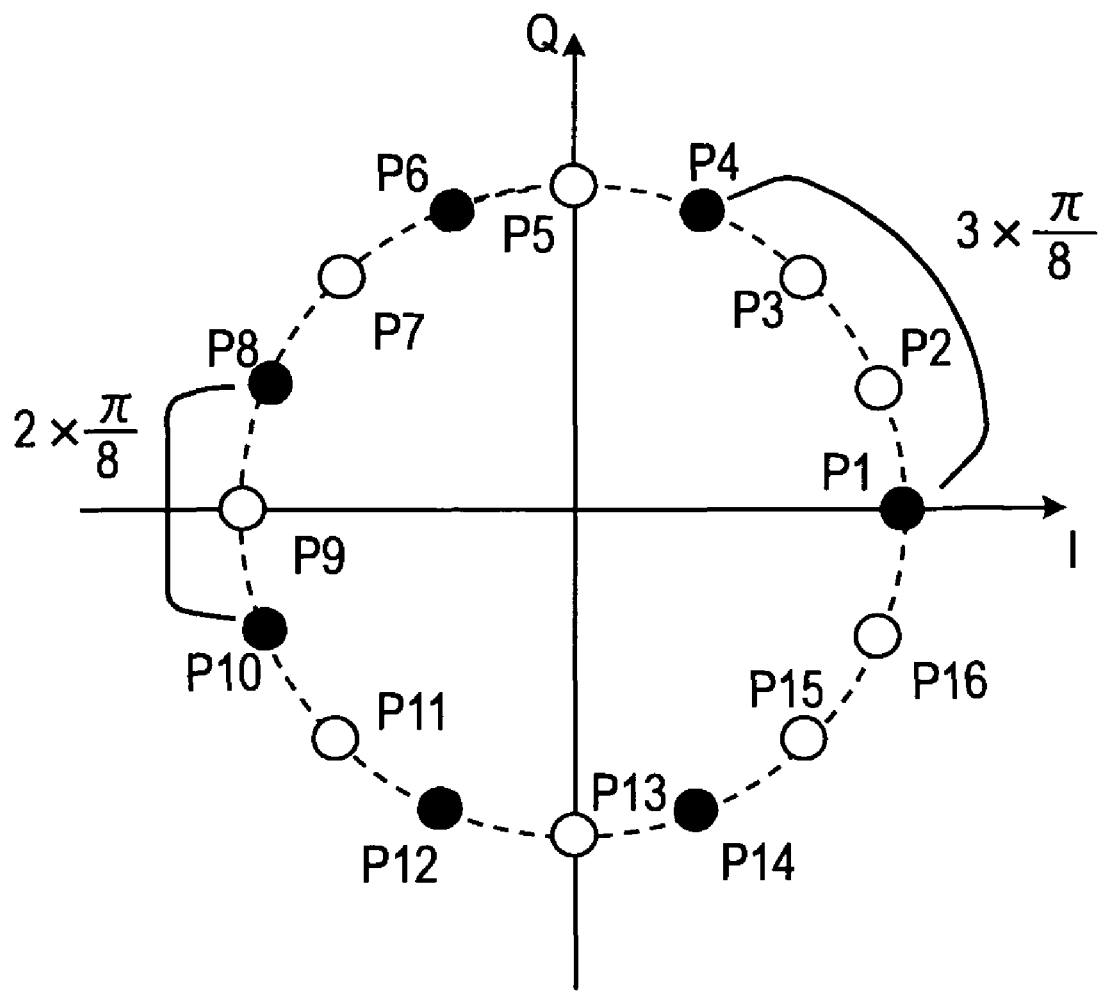
FIG. 3 is a diagram illustrating a signal point arrangement of transitional signal points in an 16-ary phase shift keying modulated transmission used in the data transmission system of the second embodiment.

In a case where the phase demodulator 14 of the transmitter 1 and the delayed modulator 30 of the receiver 3 perform 16-ary phase keying modulation, as shown in FIG. 3, 1 symbol includes sixteen signal points (from P1 to P16) which are sequentially arranged in a phase direction, and only seven signal points (P1, P4, P6, P8, P10, P12, and P14) of the sixteen signal points are used. The data of transmitting 10 is partitioned in units of 8 bits. The 8 bits correspond to information of $2^8=256$ values, and associated with any one of 343 ($7^3$) values of the phase information of three symbols, to thereby convert a binary bit string into the phase information. Other than the above-mentioned point, the second embodiment is similar to the first embodiment.

In the above, the invention made by the inventors has been described in detail based on the embodiments. However, this invention is not limited to the above-mentioned embodiments, and may be subject to various modifications without departing from the gist of the invention.

This invention relates to a communication interface and a data transmission circuit, and can be suitably applied to a network system (such as a router, a switch, a transmission system, a media convertor, a repeater, or a gateway).

While the present invention has been described in detail and pictorially in the accompanying drawings, the present invention is not limited to such detail but covers various obvious modifications and equivalent arrangements, which fall within the purview of the appended claims.

What is claimed is:

1. A data transmission system for transmitting an optical signal converted from data of transmitting, comprising:
   a transmitter; and
   a receiver,
   wherein the transmitter and the receiver are coupled to each other through a transmission path,
   wherein the transmitter comprises:
   a laser oscillator serving as a source of light with a wavelength of $\lambda$;
   a phase encoder for selecting usable signal points, from among signal points having an N-ary phase, where N is a natural number larger than three, set in one symbol, by excluding signal points having overlapping variance values of a phase noise included in a carrier generated by the laser oscillator corresponding to a predefined symbol error rate, and for sequentially converting consecutive data of at least one bit into corresponding signal points having one of one symbol and a set of symbols by confining use of signal points only to the usable signal points, in order to output the signal points thus converted as phase information;
   a differential pre-coder for obtaining a phase difference between the phase information output by the phase encoder and a signal point which has been output 1 symbol before, and outputting the phase difference as phase difference information; and
   a phase modulator for generating an N-ary carrier from light output from the laser oscillator and outputting an optical signal of a phase corresponding to the phase difference information for each symbol, and
   wherein the receiver comprises:
   a demodulator for detecting a phase difference from the received optical signal and outputting phase information including the phase difference; and
   a phase decoder for converting, into data of least one bit, the phase information output by the demodulator which includes at least one symbol.

2. The data transmission system according to claim 1, wherein
   in a phase shift keying modulated transmission having N-ary phase signal points including signal points P1 to PN arranged adjacent to one another in a phase angle direction, in a case where a variance value of a phase noise included in a carrier generated by the laser oscillator corresponding to the predefined symbol error rate is larger than ½ of a minimum interval of all the signal points and smaller than the minimum interval, the phase encoder confines use of signal points so as to satisfy a condition that the usable signal points are arranged at intervals two times or more larger than the minimum interval, at least one of the intervals is three times or more larger than the minimum interval, and a total sum of phase angles of all the intervals of the usable signal points corresponds to one cycle.

3. The data transmission system according to claim 1, wherein the phase decoder provides, in a case where the received phase information includes signal points other than the signal points defined to be used, a notification of an error detection for a signal point having a hamming distance of at least two, and executes an error correction, for a signal point having a hamming distance of at least three, by changing the signal point to a maximum-likelihood signal point.

4. A transmission code generating method of generating a transmission code for N-ary phase shift keying modulated transmission in which signal points P1 to PN of N-ary phase, where N is a natural number larger than three, are set in one symbol, the transmission code being used for converting data of transmitting into an optical signal and transmitting the optical signal by a transmitter and a receiver coupled through a transmission path, the transmission code generating method comprising the steps of:

partitioning consecutive bit data to be input in data in units of X bits, where X is a natural number; and converting one of a range of $2^X$ values indicated by the data of X bits to phase information in unique association with an $(N/2-1)^Y$ variance value of a range of Y symbols, where Y is a natural number and $2^X \leq (N/2-1)^Y$, and confining use of signal points, from among the signal points of N-ary phase, only to a signal point P1 at a phase angle 0 and n signal points P(2*n*+2), where $1 \leq n < (N/2)-1$ and $N \geq 5$.

5. An error detecting and correcting method for a transmission code, comprising the steps of:

receiving a transmission code generated by the transmission code generating method according to claim 4; and providing a notification of an error detection when a signal point other than a signal point P1 at a phase angle 0 and n signal points P(2*n*+2), where $1 \leq n < (N/2)-1$ and $N \geq 5$, that are permitted to be used is received, and performing an error correction by changing the signal point to a signal point which has a smaller hamming distance.

\* \* \* \* \*